United States Patent [19]

Ropchan

[11] 4,107,855
[45] Aug. 22, 1978

[54] TEACHING AID FOR MATHEMATICS

[76] Inventor: George Ropchan, 95 Willowridge, Weston, Ontario, Canada, M9R 3Z5

[21] Appl. No.: 792,769

[22] Filed: May 2, 1977

[51] Int. Cl.² ............................................ G09B 19/02
[52] U.S. Cl. ..................................... 35/31 R; 35/9 H
[58] Field of Search .............. 35/30, 31 R, 31 G, 32, 35/9 H, 58, 70, 73

[56] References Cited

U.S. PATENT DOCUMENTS

| | | | |
|---|---|---|---|
| 1,346,017 | 7/1920 | Goodman | 35/9 H X |
| 1,977,842 | 10/1934 | Badanes | 35/32 |
| 3,212,202 | 10/1965 | Heinichen | 35/31 R |
| 3,333,350 | 8/1967 | Hopkins | 35/31 R |
| 3,339,296 | 9/1967 | Chuy | 35/9 H X |
| 3,486,244 | 12/1969 | Horn | 35/31 R |

FOREIGN PATENT DOCUMENTS 140,790  4/1951  Australia ....................................... 35/73

*Primary Examiner*—William H. Grieb
*Attorney, Agent, or Firm*—W. Britton Moore

[57] ABSTRACT

An arithmetic teaching aid for demonstrating the spatial relation between positive and negative numbers to enable the teaching of operations in the set of integers, and includes a mirror surface with an arm projecting at an angle of 90° therefrom and having positive integer means spacedly and vertically arranged thereon so that the integers reflected by the mirror surface will indicate to students viewing from the front negative integers and their relationship with the positive integers.

5 Claims, 4 Drawing Figures

TEACHING AID FOR MATHEMATICS

This invention relates to an educational aid for use in demonstrating the relationship of numbers to aid in the teaching of addition, substraction, multiplacation and division.

It is usually the practice when teaching elementary arithmetic for the teacher to place a set of integers accompanied by diagrams on a blackboard or paper for viewing by students, with a horizontal line being drawn thereon with points spaced at equal intervals. One of these points is labelled "0" and the points to the right are labelled +1, +2, +3, +4, etc. The same procedure is applied to the left, with the points being designated -1, -2, -3, -4, etc. This is a laborious procedure and requires accuracy to avoid confusing the students. In addition, the spatial relationship is not satisfactory, as it is an arbitrary arrangement for directions.

While various teaching aids have been proposed, such as U.S. patents to Hinicken No. 3,212,202, Chuy No. 3,339,296, and Horn No. 3,486,244, none of the devices thereof have satisfactorily and effectively demonstrated a number line and the spatial relationship between nagative and positive numbers to enable the operations of arithmetic to be carried out.

Accordingly, the principal object of the present invention is to provice a device for classroom use for the teaching of the operations in arithmetic of the integers and real numbers.

Another object is the provision of a divice embodying a mirror surface with an arm projecting at an angle of 90° therefrom and having positive integer means spacedly and vertically arranged thereon so that the integers reflected by the mirror surface will indicate to students viewing from the front negative integers and their relationship with the positive integers.

A further object is to provide the arm extending from the mirror surface with a series of spaced vertical pegs having positive integer numerals mounted thereon so that their images will be reflected by the mirror surface.

These and other objects and advantages will be apparent as the specification is considered with the accompanying drawings, wherein FIG. 1 is a perspective view showing the arm supporting the positive integer means extending forwardly at right angles from a mirror surface, and the opposite numerals being shown on the mirror surface;

Figure 1:
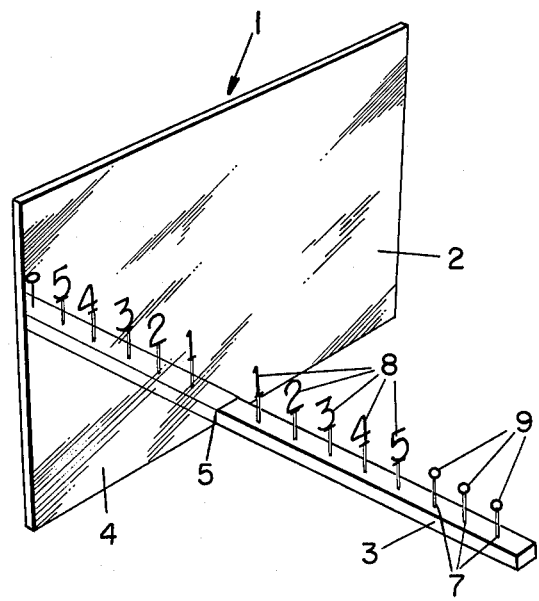
Figure 2:
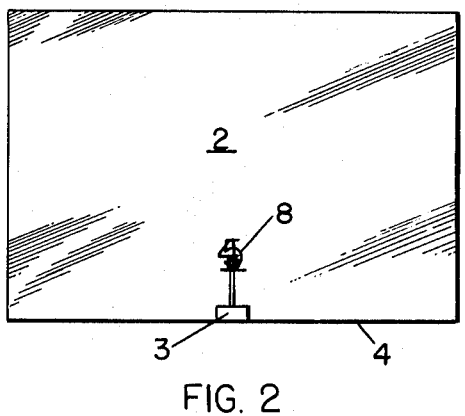
FIG. 2 is a front view of the reflecting mirror surface and the arm with positive integer means extending forwardly therefrom.
Figure 3:
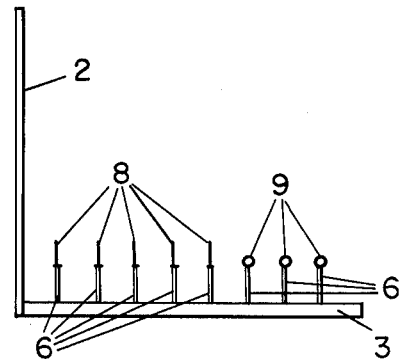
FIG. 3 is a side view of the device.
Figure 4:
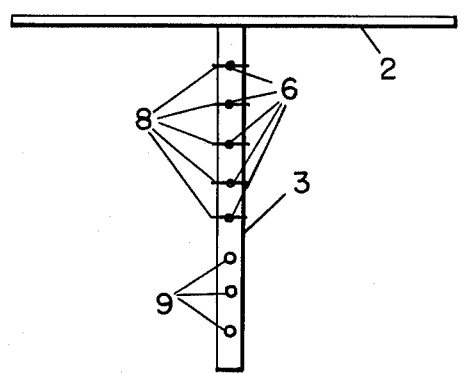
FIG. 4 is a plan view.

Referring more particularly to the drawings, wherein similar reference characters designate like parts throughout the several views, numeral 1 generally indicates the improved teaching aid including a substantially rectangular flat mirror surface 2. The latter may be in the form of a conventional glass mirror with a suitable frame, not shown, therearound, or could be represented by a highly polished reflective metal surface.

Extending through a central cut-out or slot 5 in the bottom edge 4 of mirror surface 2 is a flat, elongated relatively narrow arm 3 of any suitable material. A series of spaced apertures 7 in the arm receive upright pins or pegs 6 which extend in vertical alinement. Positive integer means 8 representing numerals 1 to 5, are suitably affixed to the upper ends of pins 6 so as to extend generally parallel to mirror surface 2. Numerals 8 are arranged in numerical order, with numeral 1 being adjacent to the mirror surface and the numerals progressing successively and forwardly therefrom. The mirror surface will represent the location of the zero.

In the interest of simplicity, only the outlines of numerals 1 to 5 are shown mounted on pins 6, and the last three pins are formed with enlarged heads or balls 9 on the upper ends thereof which may represent "etc" or "and so forth". The teacher will, of course, explain why further numerals have not been included. If so desired, it will, of course, be possible to include additional numerals, and the arm 3 could be extended with additional spaced apertures for this purpose.

Thus, it will be evident that when the mirror surface and arm 3 is arranged on a flat surface so as to extend upwardly therefrom, or held by a teacher in front of a group of students, the positive integer means 8 will extend vertically a suitable height and be clearly visible by the students. At the same time, the images of these numerals 8 will be reflected in mirror surface 2 in inverse order from 1 to 10, so that the teacher may explain and demonstrate the various operations of arithmetic and enable students to more readily understand and assimulate this knowledge.

While a preferred embodiment of this teaching aid has been shown and described, it is to be understood that various changes may be made in the size, shape, arrangement and detail of the various component parts thereof without departing from the scope and spirit of the appended claims.

What is claimed is:

1. A teaching aid for mathematics comprising a mirror surface, arm means extending at right angles from said surface, spaced peg means vertically arranged on said arm means, integer means sequentially disposed on said peg means whereby said integer means will be viewable from the front and represent positive integers and their images will be reflected in said mirror surface and will represent negative integers.

2. A teaching aid for mathematics, as defined in claim 1, wherein said mirror surface is flat and generally rectangular.

3. A teaching aid for mathematics, as defined in claim 2, wherein said arm means is flat and elongated.

4. A teaching aid for mathematics, as defined in claim 3, wherein said arm means is affixed to and centrally of the bottom edge of said mirror surface.

5. A teaching aid for mathematics, as defined by claim 4, wherein said arm means is spacedly apertured and said peg means with said integer means are arranged in horizontal alinement therein.

* * * * *